United States Patent [19]
Hayes et al.

[11] 3,751,050
[45] Aug. 7, 1973

[54] POT CHUCK

[75] Inventors: Ira Wade Hayes, Reinbeck;
Vernon John Barnes, Waterloo, both of Iowa

[73] Assignee: Deere & Company, Moline, Ill.,

[22] Filed: May 8, 1972

[21] Appl. No.: 251,289

[52] U.S. Cl............... 279/4, 279/1 Q, 269/22
[51] Int. Cl............................... B23b 31/10
[58] Field of Search............ 279/4, 1 Q, 1 SJ, 279/66; 269/22, 20

[56] References Cited
UNITED STATES PATENTS

| | | | |
|---|---|---|---|
| 3,677,559 | 7/1972 | Andre et al. | 279/4 X |
| 3,293,402 | 12/1966 | Graham | 279/4 X |
| 2,720,735 | 10/1955 | Ruehl et al. | 279/4 X |

*Primary Examiner*—Gil Weidenfeld
*Attorney*—H. Vincent Harsha, William A. Murray et al.

[57] ABSTRACT

A pot chuck for internal machining of hollow, thin walled, cylindrical objects includes a body having a cylindrical bore with a plurality of annular grooves provided in the surface of the bore. An elastomeric material fills the grooves and is bonded to the sides of the grooves. Passages in the chuck body form a means for introducing a pressurized fluid to the bottom of the grooves so that the elastomeric material will bulge and grip the object to be machined.

15 Claims, 2 Drawing Figures

PATENTED AUG 7 1973  3,751,050

POT CHUCK

BACKGROUND OF THE INVENTION

The present invention relates generally to pot chucks, and more particularly relates to an improved low cost pot chuck for internal machining of hollow, thin walled, cylindrical objects such as cylinder liners.

When gripping thin walled, hollow, cylindrical objects such as cylinder liners for internal machining, it is necessary to grip with a sufficient force to maintain the object substantially rigid with the chuck, but care must be taken since the objects are easily deformed. This is generally accomplished by forming a pressure chamber with a yieldable material so that when pressurized, it will expand and grip the object around its entire perimeter. An example of one such chuck is illustrated in U. S. Pat. No. 2,720,735 issued to Ruehl et al on 18 Oct. 1955. In this chuck, the bore of the chuck was provided with a continuous spiral groove and a one-piece hose of a yieldable material such as plastic was positioned in the groove. Pressurization of the hose caused the hose to expand so it gripped the object to be machined. This chuck had the characteristic of slowly releasing the object when pressure was exhausted from the hose, and if the hose was damaged, the entire hose had to be replaced resulting in high repair costs.

Another pot chuck used for internal machining of cylinder liners included a single bladder within the chuck bore which would expand when pressurized to grip the cylinder liner. The bladder, although it would tightly grip the cylinder liner, was somewhat spongy and would permit a small amount of movement of the cylinder liner with respect to the chuck body. Also, damage to a portion of the bladder required replacement of the entire bladder.

SUMMARY OF THE INVENTION

The principal object of the present invention is to provide a pot chuck for internal machining of hollow, thin walled, cylindrical bodies such as cylinder liners which is of low initial cost, will hold the cylinder liners substantially rigid with the chuck body, has quick release characteristics, and is easily repaired in the event of damage.

Another object of the present invention is to provide a pot chuck for internal machining of hollow, thin walled, cylindrical bodies which includes a plurality of individual gripping elements which will engage the hollow, thin walled, cylindrical object at spaced locations along the length thereof.

A further object of the present invention is to provide a pot chuck for gripping hollow, thin walled, cylindrical objects to be internally machined which includes a chuck body having an internal bore, a plurality of individual annular grooves provided in the surface of the bore, and elastomeric material filling each of the grooves and bonded to the sides of the grooves, and a plurality of passages for introducing a pressurized fluid to the bottom of each of the grooves so that the elastomeric material will bulge outwardly and grip the object to be machined.

The above objects and additional objects and advantages of the present invention will become apparent to those skilled in the art from a reading of the following detailed description when taken in conjunction with the accompanying drawings.

DESCRIPTION OF THE PREFERRED EMBODIMENTS

Figure 1:
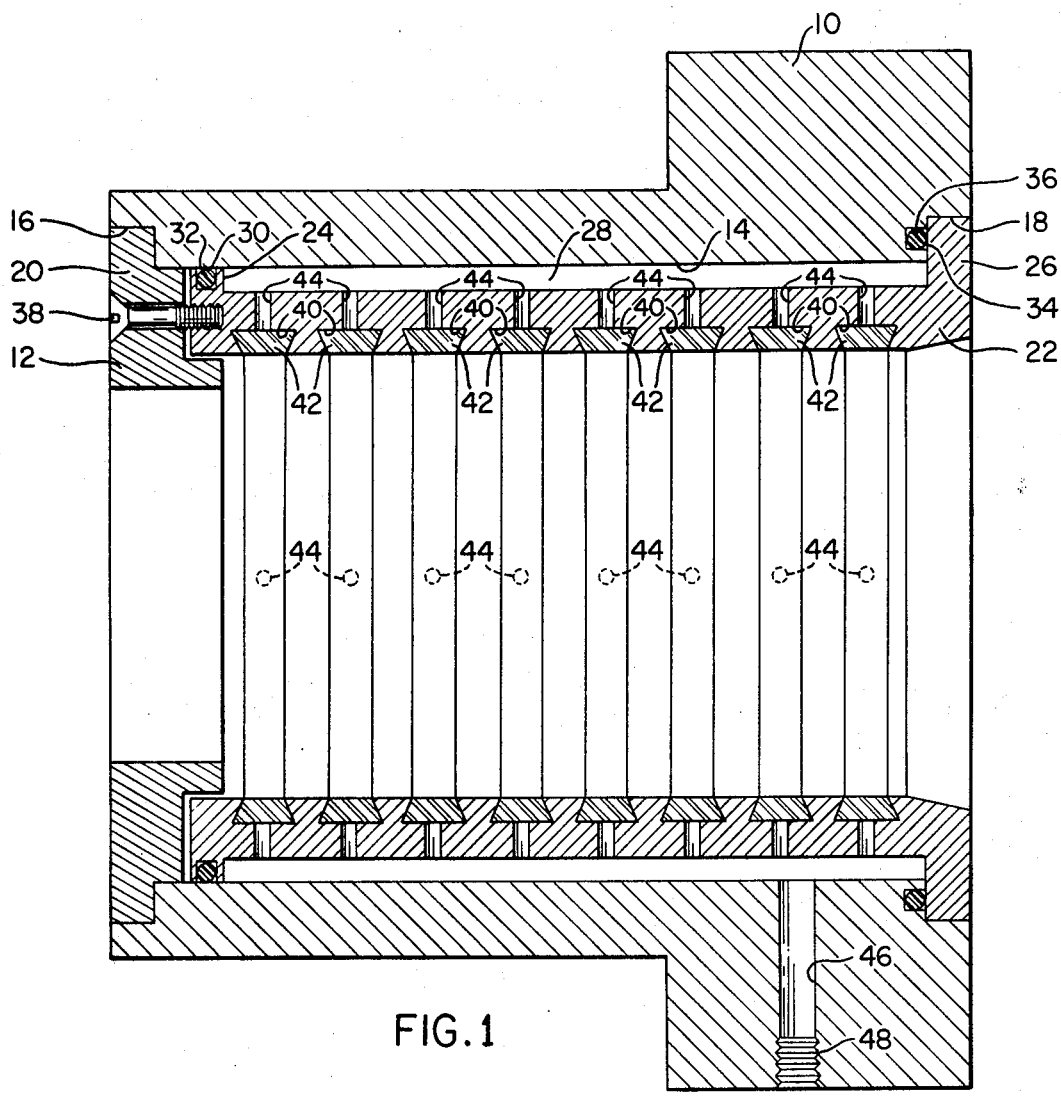
FIG. 1 is a cross-sectional view along the length of a pot chuck according to the present invention; and, FIG. 2 is a sectional view of a portion of the pot chuck illustrating a modification of the pot chuck illustrated in FIG. 1.

Referring now to the drawings, and in particular to FIG. 1, the pot chuck according to the present invention includes a casing having a main body 10 and an end cap 12. The main body 10 is generally of cylindrical shape, and is hollow to present a cylindrical bore 14. The bore 14 is provided with enlarged areas 16 and 18 at its two ends. The cap 12 is of annular shape, is slidably positioned in the bore 14 and includes a radial flange 20 which is slidably received within the enlarged area 16 and abuts against the wall between the bore 14 and enlarged area 16 to properly position the cap 12. The cap 12 is secured to the main body 10 in any suitable manner such as welding.

A hollow cylindrical liner 22 is positioned within the bore 14 and is provided with radially extending flanges 24 and 26 which slidably engage the walls of the bore 14 and enlarged area 18, respectively, to properly position the liner within the main body 10. The liner 22 has an outer diameter less than the diameter of the bore 14 so that the main body 10 and liner 22 form an annular pressure chamber 28 which is closed at its ends by the flanges 24 and 26. The flange 24 is provided with an annular groove 30 which receives an O-ring 32 providing a seal between the flange 24 and main body 10. The main body 10 is also provided with a groove 34 in the radial wall between the bore 14 and enlarged area 18 which receives an O-ring 36 providing a seal between the flange 26 and main body 10. The liner 22 is retained in a fixed position within the bore 14 by screws 38 which extend through the cap 12 and into the liner 22.

The liner 22 is provided with a plurality of individual annular grooves 40 which are spaced along the length of the liner 22. Each of the grooves 40 is generally of dovetailed configuration in cross section and is filled with an elastomeric material 42. The elastomeric material 42 is bonded to the sides of each of the grooves 40 and is free from the bottom of each of the grooves 40 although normally in engagement therewith. The outer surface of the elastomeric material in each of the grooves 40 provides a gripping surface which is normally substantially flush with the internal surface of the liner 22.

A plurality of generally radial bores 44 are provided in the liner 22 and extend through the liner 22 from the pressure chamber 28 to the bottoms of each of the grooves 40. Preferably, there are at least four equally spaced bores 44 providing communication between each of the grooves 40 and the pressure chamber 28.

A radial bore or passageway 46 extends through the main body 10 from the outer surface thereof to the pressure chamber 28 and is provided with a threaded outer end 48 adapted to receive a standard coupling on a pressure line.

The operation of the above-described pot chuck should be obvious to those skilled in the art, but is essentially as follows. The pot chuck is held in a conventional manner and a cylinder liner inserted into the right-hand end of the liner 22, the inside diameter of the liner 22 of necessity being just slightly greater than the outside diameter of the cylinder liner. Engagement between the cylinder liner and cap 12 will prevent the cylinder liner from being inserted too far into the liner 22. With the cylinder liner positioned within the liner 22, a fluid, preferably air, under pressure is introduced to the pressure chamber 28 through the bore 46. The pressurized fluid within the chamber 28 is routed to the bottoms of the grooves 40 through the bores 44 and causes the elastomeric material 42 to bulge outwardly so that its outer surface moves towards the axis of the liner 22 and grips the cyliner liner. This rigidly holds the cylinder liner so that it can be accurately machined internally.

When the cylinder liner has been properly machined, the pressure chamber 28 is vented to atmosphere through the bore 46 so that the elastomeric material 42 returns to its original position as illustrated in FIG. 1 and the cylinder liner can be removed.

The above-described pot chuck has a very low initial cost, has proved to have a very quick release characteristic, and has such a good gripping capability that the quality of work performed has been of better quality than the work performed with previous pot chucks. Also, damage to a portion of the elastomeric material only requires replacement of the material in one of the grooves and this substantially lowers repair costs.

Figure 2:
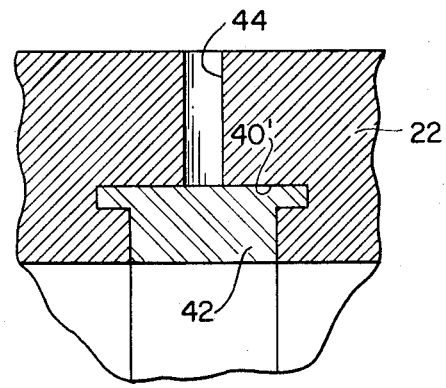

FIG. 2 illustrates a modified form of the pot chuck according to the present invention, and is, in all respects, similar to the pot chuck illustrated in FIG. 1 except for the configuration of the grooves provided in the liner 22. In the embodiment illustrated in FIG. 2, the grooves 40' are of T-shaped configuration in cross section. The T-shaped configuration of the grooves 40' makes it easier to bond the elastomeric material 42 to the walls of the groove without also bonding the elastomeric material to the bottom of the groove, and the T-shaped configuration also aids the bonding to hold the material within the groove better than the dovetail configuration of the grooves in the FIG. 1 embodiment.

Having thus described and illustrated two preferred embodiments of the invention, various modifications within the spirit and scope of the invention will become apparent to those skilled in the art and can be made without departing from the underlying principles of the invention. Therefore, the invention should not be limited by the specific illustrations and descriptions, but only by the fair scope of the following claims.

We claim:

1. A pot chuck for holding objects to be machined comprising: a casing having a cylindrical bore; a hollow cylindrical liner positioned within the casing bore and forming an annular pressure chamber therewith; a plurality of annular grooves provided in the internal surface of the liner; an elastomeric material filling the grooves and having outer surfaces normally substantially flush with the internal surface of the liner; a plurality of passageways provided through the liner from the pressure chamber to the grooves; and passage means provided in the casing for introducing a fluid under pressure to the pressure chamber whereby the elastomeric material will yield under the pressure and grip an object to be machined.

2. A pot chuck as set forth in claim 1 wherein the elastomeric material is bonded to the sides of each of the grooves and is free from the bottom of each of the grooves although normally in engagement therewith.

3. A pot chuck as set forth in claim 1 wherein each of the grooves has a greater width at its bottom than at the internal surface of the liner whereby the shape of the grooves serves to hold the elastomeric material within the grooves.

4. A pot chuck as set forth in claim 3 wherein each of the grooves is generally of dovetailed cross-sectional configuration.

5. A pot chuck as set forth in claim 3 wherein each of the grooves is generally of T-shaped cross-sectional configuration.

6. A pot chuck as set forth in claim 3 wherein the elastomeric material is bonded to the sides of each of the grooves and is free from the bottom of each of the grooves although normally in engagement therewith.

7. A pot chuck for holding thin walled, hollow, cylindrical objects to be machined comprising: a chuck body having a cylindrical bore of a diameter slightly larger than the outside diameter of the cylindrical object to be machined; a plurality of annular grooves provided in the surface of the cylindrical bore in spaced positions from one end thereof to the other; elastomeric gripping material filling each of the grooves and having outer gripping surfaces normally substantially flush with the surface of the bore; and passage means leading from the external surface of the body to each of the grooves for introducing a fluid under pressure to each of the grooves and the elastomeric material whereby the elastomeric material will yield and its outer gripping surfaces will move outwardly of the grooves to grip the cylindrical object to be machined.

8. A pot chuck as set forth in claim 7 wherein each of the grooves has a greater width at its bottom than at the surface of the bore whereby the shape of the grooves serves to hold the elastomeric material within the grooves.

9. A pot chuck as set forth in claim 8 wherein the elastomeric material is bonded to the sides of each of the grooves and is free from the bottom of each of the grooves although normally in engagement therewith.

10. A pot chuck as set forth in claim 9 wherein the passage means leads to the bottom of each groove at a plurality of locations.

11. A pot chuck for holding hollow objects to be internally machined comprising: a casing having a cylindrical bore; a hollow cylindrical liner member positioned in the casing bore, having an outside diameter less than the diameter of the case, and including an annular outwardly extending flange at each end thereof of a size to just fit within the casing bore; seal means between each of the flanges and the casing whereby the casing and liner form an annular pressure chamber between the flanges; a plurality of internal annular grooves provided in the liner; a plurality of generally radially extending passageways extending between each of the grooves and the pressure chamber; an elastomeric material filling each of the grooves and having outer gripping surfaces normally substantially flush with the internal surface of the liner; and means for introducing a fluid under pressure to the pressure chamber whereby the elastomeric material will yield under the pressure and its outer gripping surfaces will move outwardly of the grooves to grip the object to be machined.

12. A pot chuck as set forth in claim 11 wherein each of the grooves has a greater width at its bottom than at the internal surface of the liner whereby the shape of the grooves retains the elastomeric material within the grooves.

13. A pot chuck as set forth in claim 12 wherein the elastomeric material is bonded to the sides of each groove and is free from the bottom of each groove although normally in engagement therewith.

14. A pot chuck as set forth in claim 13 wherein each of the grooves is generally of T-shaped cross-sectional configuration.

15. A pot chuck as set forth in claim 13 wherein each of the grooves is generally of dovetailed cross-sectional configuration.

* * * * *